United States Patent
Willner et al.

(10) Patent No.: US 7,072,839 B2
(45) Date of Patent: Jul. 4, 2006

(54) SYSTEMS AND METHODS WHEREIN A CONSUMABLE ITEM PARAMETER IS EXCHANGED BETWEEN A CONSUMABLE ITEM AND A CONSUMING DEVICE

(75) Inventors: Barry E. Willner, Briarcliff Manor, NY (US); Edith H. Stern, Yorktown Heights, NY (US); Paul A. Moskowitz, Yorktown Heights, NY (US); Samuel Dinkin, Austin, TX (US); Philip S. Yu, Chappaqua, NY (US); David P. Greene, Ossining, NY (US); William Grey, Millwood, NY (US)

(73) Assignee: International Buisness Machines Corporation, Armonk, NY (US)

( * ) Notice: Subject to any disclaimer, the term of this patent is extended or adjusted under 35 U.S.C. 154(b) by 970 days.

(21) Appl. No.: 09/790,090

(22) Filed: Feb. 21, 2001

(65) Prior Publication Data

US 2002/0116204 A1    Aug. 22, 2002

(51) Int. Cl.
*G06Q 99/00* (2006.01)
(52) U.S. Cl. .................... 705/1; 705/16; 700/9; 60/614
(58) Field of Classification Search ..................... None
See application file for complete search history.

(56) References Cited

U.S. PATENT DOCUMENTS 5,327,066 A * 7/1994 Smith .......................... 320/109
6,045,040 A * 4/2000 Streicher et al. ............ 235/381
6,062,473 A * 5/2000 Blalock et al. ............. 235/381
6,185,501 B1 * 2/2001 Smith et al. ................ 701/200

FOREIGN PATENT DOCUMENTS

GB    WO01/52200 A  *  7/2001

OTHER PUBLICATIONS

Auto Engines: Goodbye to Conventional Design, Dann, Jan. 1984, Machine Design, v56, p. 62, entire document.*
Lindsey Arent, "Cooking Without Thinking," Wired News (Jun. 7, 1999).
David Brock, "Intelligent Infrastructure: A Method for Networking Physical Objects," Massachusetts Institute of Technology (Apr. 12, 2000).

* cited by examiner

*Primary Examiner*—John G. Weiss
*Assistant Examiner*—Michael J. Fisher
(74) *Attorney, Agent, or Firm*—Buckley, Maschoff & Talwalkar, LLC; Stephen C. Kaufman

(57) ABSTRACT

Systems and methods are provided wherein a consumable item parameter is exchanged between a consumable item and a consuming device. According to one embodiment, a consumable item parameter request is transmitted to a device associated with a consumable item, and the consumable item parameter is then received. The device may comprise, for example, the consumable item or a device associated with dispensing the consumable item. The device may also comprise, for example, a device associated with a consumption of the consumable item, a device adapted to control a consumption of the consumable item, or a device that consumes the consumable item.

20 Claims, 15 Drawing Sheets

900

| PARAMETER IDENTIFIER 902 | DESCRIPTION 904 | VALUE(S) 906 |
|---|---|---|
| DO-1001 | AVAILABLE OCTANE RATING | 87, 89, 93 |
| DO-1002 | FUEL DETERGENT | YES, NO |
| DO-1003 | AMBIENT TEMPERATURE | 45° C |
| DO-1004 | ALTITUDE | 450 M |

FIG. 9

| PARAMETER IDENTIFIER 1002 | DESCRIPTION 1004 | CURRENT VALUE 1006 |
|---|---|---|
| DI-1001 | VEHICLE IDENTIFIER | FORD-1001 |
| DI-1002 | ENGINE TEMPERATURE | 155° C |
| DI-1003 | EMISSIONS CONTROL DRIVER VERSION | ECD1.4.1 |
| DI-1004 | PREFERRED OCTANE RATING | 89 |

1100

| RULE IDENTIFIER 1102 | CONDITION 1104 | ACTION 1106 |
|---|---|---|
| DR-1001 | DI-1003 < ECD1.5 | OFFER TO UPDATE |
| DR-1002 | DI-1004 = "ANY" | SELECT 93 OCTANE |
| DR-1003 | DI-1002 > 200° C | INFORM ATTENDANT |

| TRANSACTION IDENTIFIER: T10001 | | 1202 |
|---|---|---|
| CONSUMING DEVICE IDENTIFIER: CD1001 | | 1204 |
| PAYMENT IDENTIFIER: 1111-2222-3333-4444 | | 1206 |
| DATE AND TIME: 07-04-03 AT 11:45 AM | | 1208 |
| TRANSACTION TOTAL: $23.80 | | 1210 |
| TRANSACTION STATUS: COMPLETE | | 1212 |
| PARAMETER IDENTIFIER 1214 | VALUE 1216 | COST 1218 |
| DO-1001 | 89 (10 GALLONS) | $21.00 |
| DO-1002 | YES | $0.30 |
| DI-1001 | FORD-1001 | NA |
| DI-1003 | ECD1.4.1 (UPDATED TO 1.5) | $2.50 |

| PARAMETER IDENTIFIER 1302 | DESCRIPTION 1304 | CURRENT VALUE 1306 |
|---|---|---|
| CO-1001 | VEHICLE IDENTIFIER | FORD-1001 |
| CO-1002 | ENGINE TEMPERATURE | 155° C |
| CO-1003 | EMISSIONS CONTROL DRIVER VERSION | ECD1.4.1 |
| CO-1004 | PREFERRED OCTANE RATING | 89 |

| PARAMETER IDENTIFIER 1402 | DESCRIPTION 1404 | VALUE(S) 1406 |
|---|---|---|
| CI-1001 | OCTANE RATING | 89 |
| CI-1002 | FUEL DETERGENT | YES |
| CI-1003 | AMBIENT TEMPERATURE | 45° C |
| CI-1004 | ALTITUDE | 450 M |

| RULE IDENTIFIER 1502 | CONDITION 1504 | ACTION 1506 |
|---|---|---|
| CR-1001 | CI-1001 = 93 | INFORM OCU |
| CR-1002 | CI-1002 = YES | INFORM OCU |
| CR-1003 | CI-1003 < 0° C | INFORM OCU |
| CR-1004 | CI-1004 > 600 M | INFORM OCU |

FIG. 15

SYSTEMS AND METHODS WHEREIN A CONSUMABLE ITEM PARAMETER IS EXCHANGED BETWEEN A CONSUMABLE ITEM AND A CONSUMING DEVICE

FIELD

The present invention relates to consumption systems. In particular, the present invention relates to systems and methods wherein a consumable item parameter is exchanged between a consumable item and a consuming device.

BACKGROUND

Many devices use consumable items during operation. For example, some devices are powered by consumable items, such as automobiles that are powered by gasoline and laptop computers that are powered by one or more batteries. Other devices transform consumable items, such as printers that print on paper and cooking devices that cook food ingredients.

In all of these cases, however, a number of factors can reduce how efficiently or effectively a device can use a consumable item. For example, a consuming device may be able to use any of a number of different types or qualities of consumable items. In this case, the device may not know which type or quality of consumable item is currently being used, causing the device to use the consumable item less efficiently. Consider an automobile that is able to use gasoline having a number different octane ratings. Because the automobile does not know which octane rating is currently being used, the engine may use the gasoline less efficiently. Moreover, it may be impractical to have an operator provide a signal to a device indicating which type or quality of consumable item is being used.

Similarly, a device may more efficiently or effectively use different consumable items at different times. For example, an engine that has recently been tuned-up may be able to more efficiently use a gasoline having a particular octane rating while an engine that has none recently been tuned-up may be able to more efficiently use a gasoline having a different octane rating.

External factors may also determine how efficiently or effectively a device can use a consumable item. For example, a current altitude or outside temperature may determine how efficiently an automobile is able to use gasoline. Moreover, if the automobile was aware of the current altitude and outside temperature, it may be able to use the gasoline more efficiently. It may not be practical, however, to equip all automobiles with altitude and/or temperature sensors.

Thus, a device may receive a consumable item that it is unable to efficiently and/or effectively use.

SUMMARY

To alleviate problems inherent in the prior art, the present invention introduces systems and methods wherein a consumable item parameter is exchanged between a consumable item and a consuming device.

According to one embodiment of the present invention, a consumable item parameter request is transmitted to a device associated with a consumable item, and the consumable item parameter is then received. The device may comprise, for example, the consumable item or a device associated with dispensing the consumable item. The device may also comprise, for example, a device associated with a consumption of the consumable item, a device adapted to control a consumption of the consumable item, or a device that consumes the consumable item.

Another embodiment is directed to a computer-implemented method of facilitating consumption of a consumable item. In this case, a consumable item parameter request is transmitted via a wireless device to at least one of: (i) a consumable item, and (ii) a device associated with dispensing the consumable item. The consumable item parameter, including information usable to improve a consumption of the consumable item, is received along with the consumable item. The consumable item is then consumed in accordance with the consumable item parameter.

According to still another embodiment, a consumable item parameter request is transmitted, via a wireless device, to a device associated with a consumption of the consumable item. The consumable item parameter is received from the device, and, based on the consumable item parameter, a consumable item is selected or adjusted. The consumable item is then dispensed.

According to another embodiment, a consumable item parameter request is received from a device associated with a consumable item, and the consumable item parameter is then transmitted.

One embodiment of the present invention comprises: means for transmitting a consumable item parameter request to a device associated with the consumable item; and means for receiving the consumable item parameter.

Another embodiment comprises: means for transmitting via a wireless device a consumable item parameter request to at least one of: (i) a consumable item, and (ii) a device associated with dispensing a consumable item; means for receiving the consumable item parameter, the consumable item parameter comprising information usable to improve a consumption of the consumable item; means for receiving the consumable item; and means for consuming the consumable item in accordance with the consumable item parameter.

Another embodiment comprises: means for transmitting via a wireless device a consumable item parameter request to a device associated with a consumption of a consumable item; means for receiving the consumable item parameter from the device; means for performing at least one of: (i) a selection of the consumable item; and (ii) an adjustment of the consumable item, based on the consumable item parameter; and means for dispensing the consumable item.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 9 is a tabular representation of a portion of a dispensing device output parameter database according to an embodiment of the present invention.

FIG. 11 is a tabular representation of a portion of a dispensing device rule database according to an embodiment of the present invention.

FIG. 12 is a tabular representation of a record in a transaction database according to an embodiment of the present invention.

FIG. 13 is a tabular representation of a portion of a consuming device output parameter database according to an embodiment of the present invention.

FIG. 14 is a tabular representation of a portion of a consuming device input parameter database according to an embodiment of the present invention.

FIG. 15 is a tabular representation of a portion of a consuming device rule database according to an embodiment of the present invention.

DETAILED DESCRIPTION

Embodiments of the present invention are directed to systems and methods wherein a consumable item parameter is exchanged between a "consumable item" and a "consuming device." As used herein, the phrase "consumable item" refers to any item capable of being consumed. For example, a consumable item may be a fuel that is used to power a device (e.g., a vehicle). Examples of such fuels include gasoline, propane, and electricity (including batteries used to power a portable device). A consumable item may also be transformed, such a paper transformed by a printer or a food ingredient transformed by a cooking device. A consumable item may also be utilized, such as a bandwidth utilized to communicate electronic information. Note that a consumable item may also comprise information, such as entertainment information (e.g., an electronic representation of a book, a song, or a movie) that is "consumed" by a consumer.

As used herein, the phrase "consuming device" refers to any device that capable of consuming a consumable item. As described above, a vehicle, a printer, a cooking device, a communication device, and an entertainment device are some examples of a consuming device.

Note that the "exchange" of the consumable item parameter may comprise, for example, a consumable item transmitting the consumable item parameter to a consuming device. The exchange may also comprise, for example, a consuming device transmitting the consumable item parameter to a consumable item.

Figure 1:
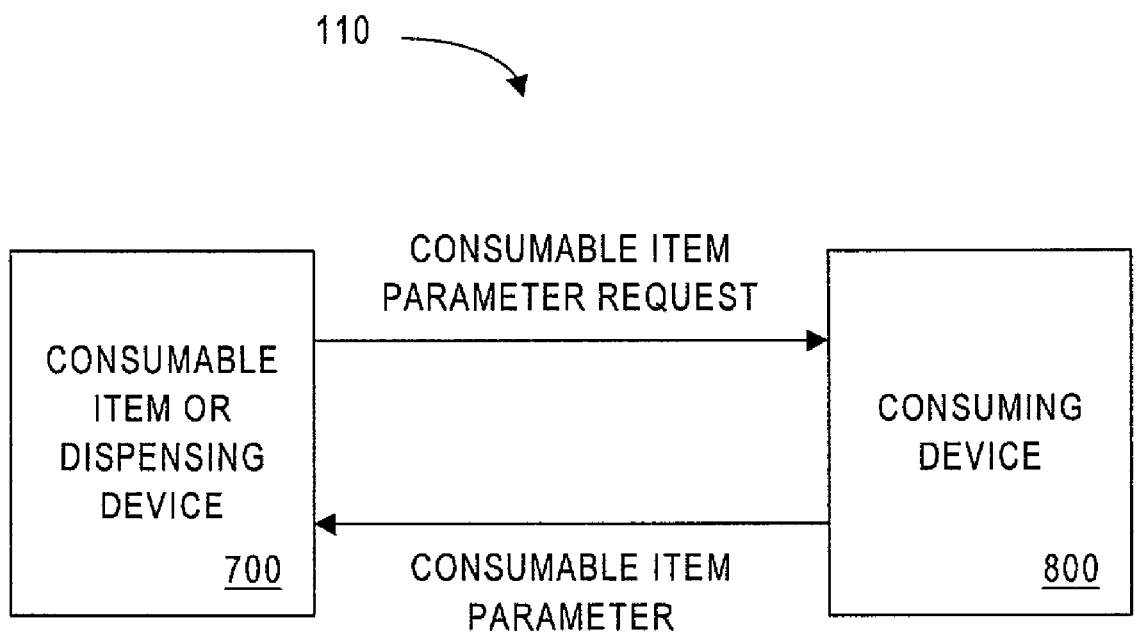
FIG. 1 is an information flow diagram according to an embodiment of the present invention.

Turning now in detail to the drawings, FIG. 1 is an information flow diagram according to one embodiment of the present invention. As shown in FIG. 1, a consumption system 110 may comprise a consumable item 700 communicating with a consuming device 800. Note that the consuming device 800 may instead communicate with, for example, a consumable item dispensing device (e.g., a fuel pump) or a controller associated with the consumable item 700.

According to an embodiment of the present invention, the consumable item or dispensing device 700 transmits a consumable item parameter request to the consuming device 800. For example, a fuel pump may transmit a request to an automobile asking for the automobile's preferred gasoline octane rating.

The consumable item or dispensing device 700 then receives a consumable item parameter from the consuming device 800. For example, the fuel pump may receive from the automobile an indication that gasoline having an octane rating of "87" is preferred.

Figure 2:
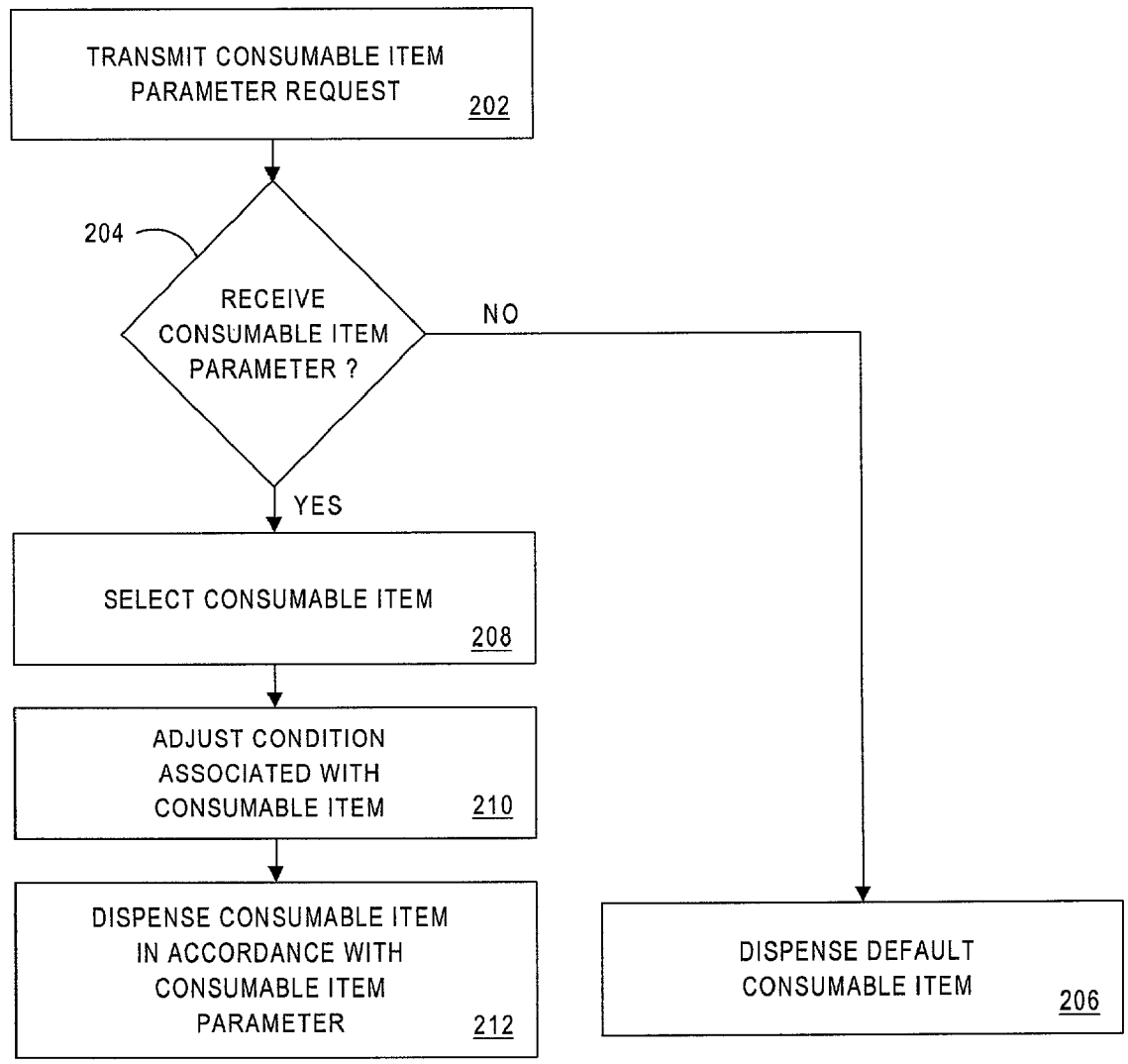
FIG. 2 is a flow chart of a method according to an embodiment of the present invention.

FIG. 2 is a flow chart of a method that may be performed according to this embodiment. The method may be performed, for example, by the consumable item or dispensing device 700 shown in FIG. 1. The flow charts in FIG. 2 and the other figures described herein do not imply a fixed order to the steps, and embodiments of the present invention can be practiced in any order that is practicable. Moreover, the method may instead be performed by any of the devices described herein.

At 202, a consumable item parameter request is transmitted. The consumable item parameter request may be transmitted, for example, from the consumable item or dispensing device 700 (e.g., a fuel pump) to a device associated with the consumable item (e.g., an automobile).

The device that receives the consumable item parameter request may be, for example, a device associated with a consumption of the consumable item. For example, the device may be a communication device installed in a automobile. The device may also be adapted to control a consumption of the consumable item and/or consume the consumable item. For example, the device may be an Electronic Control Unit (ECU) associated with an automobile's fuel injection system. Examples of a device that consumes the consumable item include a device powered by the consumable item (e.g., a vehicle), a device adapted to transform the consumable item (e.g., a printer), a medium for storing the consumable item (e.g., a memory unit), and/or a processor for executing or translating the consumable item (e.g., a processor associated with an MP3 player).

The consumable item parameter request may include, for example, a requesting device identifier, a customer identifier, a consumable item provider identifier (e.g., a gasoline provider identifier), a third party identifier (e.g., a party that provides updates to emissions control software), a consumable item parameter identifier, a payment identifier (e.g., a credit card number), and/or a consumable item identifier.

Note that a consumable item parameter may comprise, for example, any information associated with a consumable item. For example, the consumable item parameter may comprise any information associated with fuel (e.g., an octane rating), bandwidth (e.g., a maximum transfer rate), entertainment information (e.g., a music category), executable information (e.g., an operating system requirement), food (e.g., a cooking time), or information storage capacity.

According to one embodiment, the consumable item parameter comprises information that may be used, for example, to select the consumable item, select a condition associated with the consumable item,) select a quantity associated with the consumable item, and/or select a price associated with the consumable item. For example, a consumable item parameter may comprise an automobile's Vehicle Identification Number (VIN). Based on the VIN, a fuel pump may then determine an appropriate octane rating as well as whether or not detergent should be added to fuel that is dispensed for that automobile.

The consumable item parameter may also comprise a requested consumable item. For example, an automobile may transmit information to a fuel pump indicating that only gasoline having an octane rating of "93" should be dispensed. Similarly, the consumable item parameter may comprise an indication of acceptable consumable items (e.g., a list of appropriate or compatible consumable items) or consumable item preference information (e.g., indicating that if both a first item and a second item are available, the first item should be dispensed).

The consumable item parameter may also indicate, for example, an operating condition, such a current temperature of an automobile's engine. The consumable item parameter may instead indicate, for example, an ambient condition (e.g., the current outside temperature).

If a consumable item parameter is not received at 204, a default consumable item is dispensed at 206. For example, a fuel pump may be configured such that gasoline having an octane rating of "87" is always dispensed if no consumable item parameter is received from an automobile.

If a consumable item parameter is received at 204, a consumable item may be selected at 208. Note that the consumable item parameter may be received, for example, from the device that received the consumable item parameter request. According to another embodiment, the consumable item parameter is instead received from a device other than the device that received the consumable item parameter request. For example, a fuel pump may transmit a request for a preferred octane rating to a communication device installed in an automobile. The communication device may then relay the request to a device associated with a driver (e.g., a PDA association with the driver), which can then respond directly to the request.

The consumable item may be directly selected based on the consumable item parameter (e.g., the consumable item parameter may indicate whether or not detergent should be added to dispensed fuel). According to another embodiment, one or more rules are used to select the consumable item based on the consumable item parameter. For example, the consumable item parameter may indicate a year that an automobile was manufactured, and all automobiles manufactured after 1995 may have detergent added to dispended fuel.

At 210, a condition associated with the consumable item may be adjusted. For example, the temperature or quantity of a dispensed fuel may be adjusted based on the consumable item parameter. At 212, the consumable item parameter is dispensed in accordance with the consumable item parameter.

Figure 3:
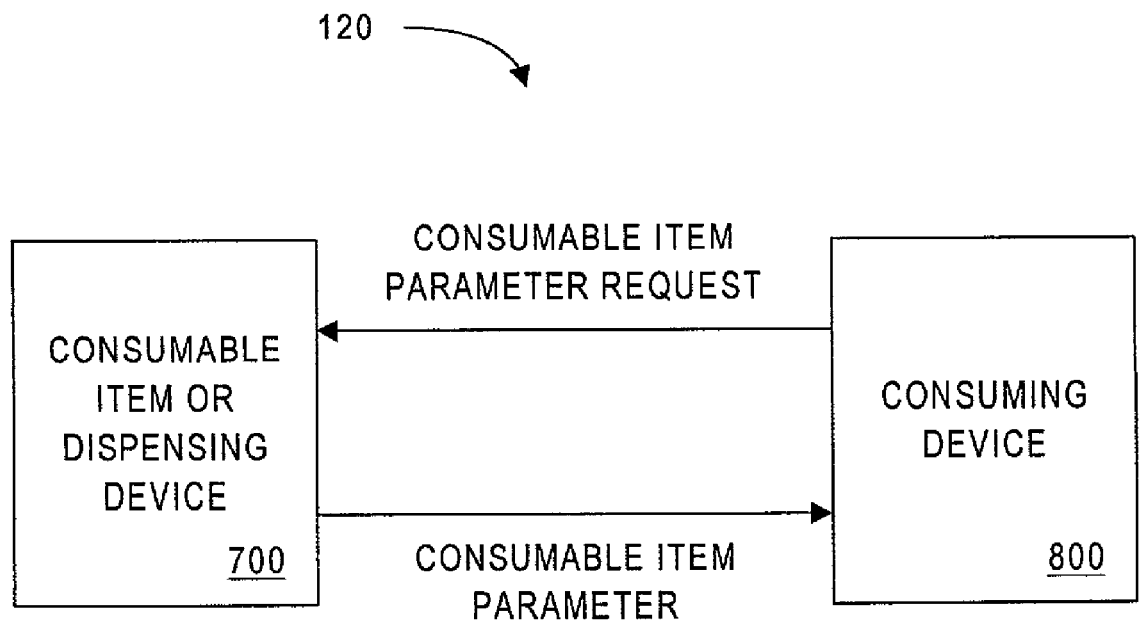
FIG. 3 is an information flow diagram according to another embodiment of the present invention.

FIG. 3 is an information flow diagram according to another embodiment of the present invention. As shown in FIG. 3, a consumption system 120 again comprises a consumable item or dispensing device 700 communicating with a consuming device 800. In this case, however, the consuming device 800 transmits a consumable item parameter request to the consumable item or dispensing device 700. For example, an automobile may transmit to a fuel pump a request for an altitude and a local emissions quality parameter (e.g., indicating an acceptable level of emissions that is currently applicable to a region).

The consuming device 800 then receives a consumable item parameter from the consumable item or dispensing device 700. For example, the automobile may receive from the fuel pump the appropriate altitude and local emissions quality parameter values.

Figure 4:
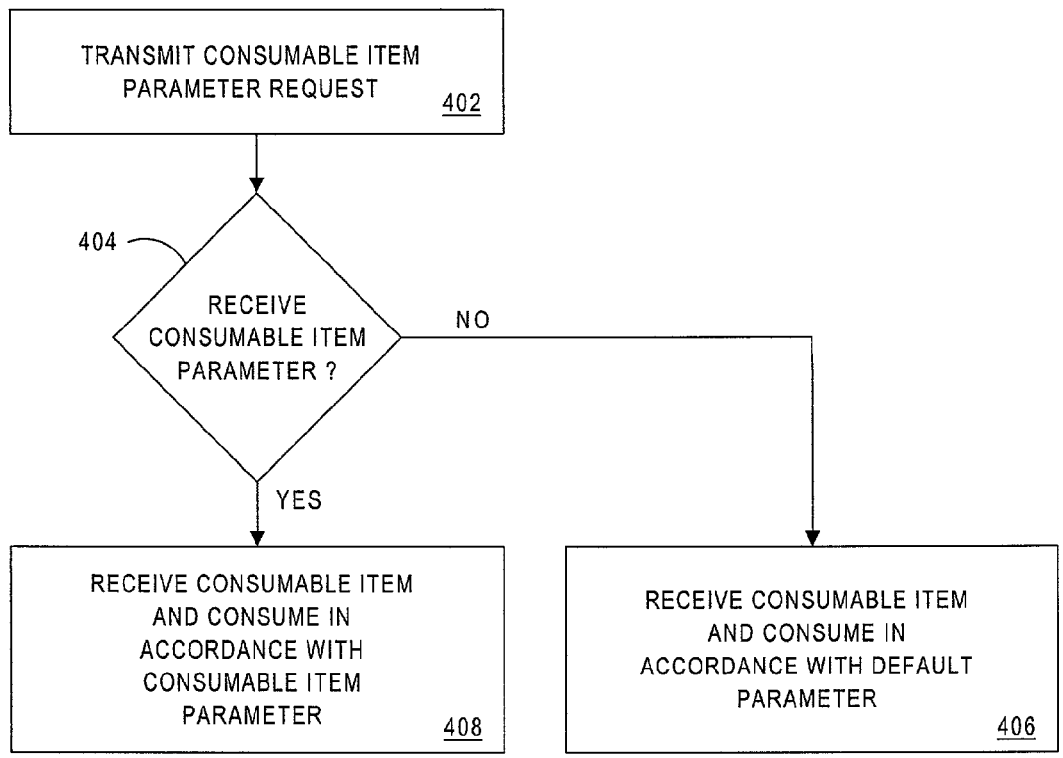
FIG. 4 is a flow chart of a method according to another embodiment of the present invention.

FIG. 4 is a flow chart of a method according to this embodiment. At 402, a consumable item parameter request is transmitted. For example, the consumable item parameter request may be transmitted to a consumable item or a device associated with dispensing the consumable item. The consumable item parameter request may be transmitted, for example, to a fuel dispensing device, a package containing the consumable item, a medium storing the consumable item, a device attached to the consumable item, a device incorporated within the consumable item, or a device located in proximity with the consumable item.

If a consumable item parameter is not received at 404, the consumable item is received and consumed in accordance with one or more default parameters at 406. For example, an automobile may use fuel in accordance with default altitude and local emissions quality values.

If a consumable item parameter is received at 404, the consumable item is received and consumed in accordance with the consumable item parameters at 408. Note that the consumable item parameter may comprise, for example, information usable to improve a consumption of the consumable item. The consumable item parameter may also comprise quality information, quantity information, or a condition associated with the consumable item (e.g., a fuel temperature). According to another embodiment, the consumable item parameter comprises an ambient condition (e.g., a current outside temperature).

According to one embodiment, the consuming device may further transmit a request for a particular consumable item based on the consumable item parameter. For example, an automobile may request gasoline having a particular octane rating based on a list of available octane ratings received from a fuel pump. According to one embodiment, one or more rules are used to select the consumable item based on the consumable item parameter.

Consumption System Overview

Figure 5:
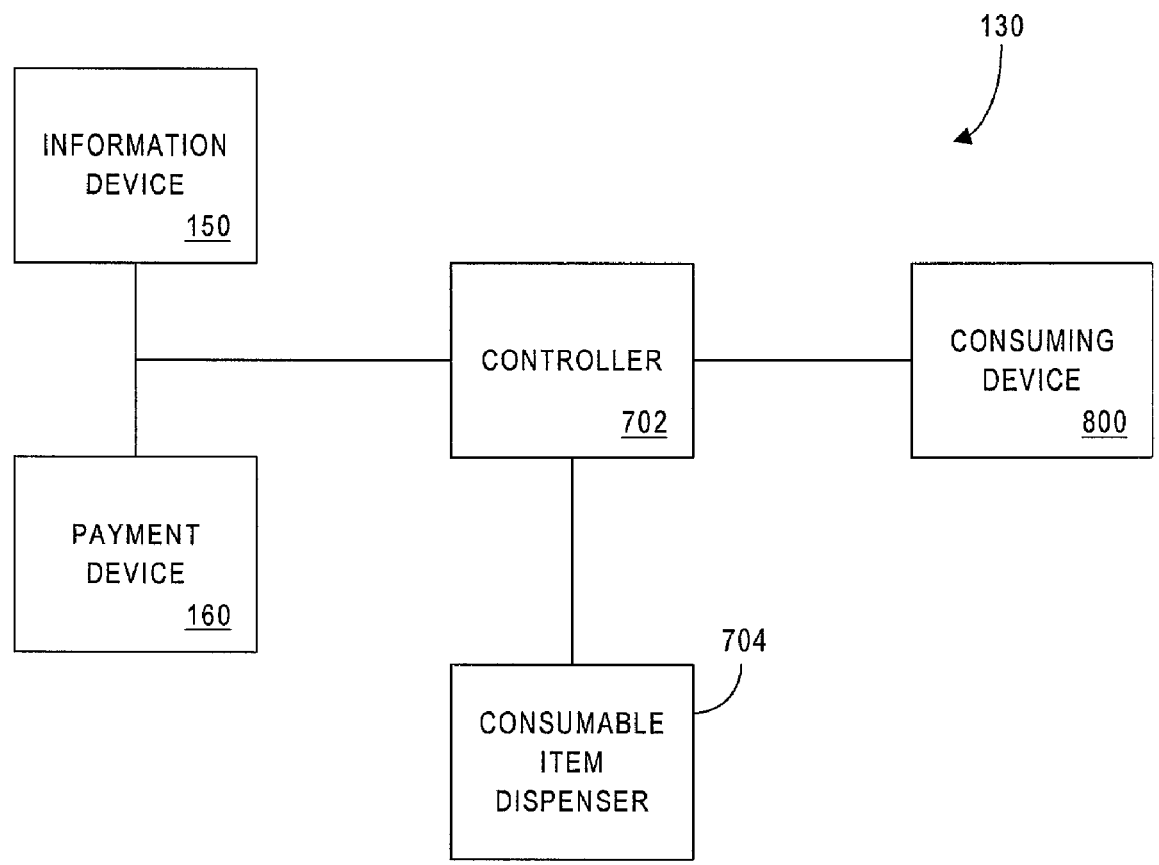
FIG. 5 is a block diagram overview of a consumption system according to an embodiment of the present invention.

FIG. 5 is a block diagram of a consumption system 130 according to one embodiment of the present invention. The consumption system 130 includes a controller 702 in communication with a consuming device 800. As used herein, devices (such as the consuming device 800 and the controller 702) may communicate via a direct connection, such as a Universal Serial Bus (USB) connection. Devices may also communicate, for example, via a communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a wireless LAN network (e.g., in accordance with an 802.11 standard), or an Internet Protocol (IP) network such as the Internet, an intranet or an extranet. Devices may further communicate through chemicals or materials. For example, a device may be adapted to detect whether or not a particular chemical is present in a consumable item.

Note that, as used herein, communications include those enabled by wired or wireless technology. For example, the controller 702 may communicate with the consuming device 800 using Bluetooth technology. Bluetooth technology allows a wide range of computing and telecommunication devices to be interconnected via wireless connections. Specifications and other information regarding Bluetooth technology are available at the Bluetooth Web site www-.bluetooth.com. In embodiments utilizing Bluetooth technology, communicating devices may be equipped with a microchip transceiver that transmits and receives information in a frequency band of 2.45 GHz (with some variation of bandwidth in different countries). Connections can be point-to-point or multipoint over a current maximum range of ten meters. Embodiments using Bluetooth technology may require the additional use of one or more communication stations (e.g., a communication station may be positioned near a fuel dispensing device, and the communication station may relay information between the controller 702 and the consuming device 800).

Note that although a single controller 702 is shown in FIG. 5, any number of controllers 702 may be included in the consumption system 130. Similarly, any number of consuming devices 800, or other devices described herein, may be included in the consumption system 130 according to embodiments of the present invention.

The consuming device 800 and the controller 702 may be any devices capable of performing the various functions described herein. The consuming device 800 may be, for example: a PC, a portable computing device such as a Personal Digital Assistant (PDA), a wired or wireless telephone, a game terminal (e.g., a SONY PLAY STATION® video game terminal), a Compact Disc (CD) player, a printer, an automobile or a processor associated with an automobile, or any other appropriate storage and/or communication device.

The controller 702 is also in communication with a consumable item dispenser 704. According to one embodiment, the controller 702 and the consumable item dispenser 704 are incorporated into a single device, such as a gasoline pump. According to one embodiment, the controller 702 also communicates with an information device 150. For example, controllers 702 located at a number of different gasoline stations may receive consumable item parameters (e.g., local emissions quality parameters) or rules from one or more remote information devices 150 via the Internet.

Note that the devices shown in FIG. 5 need not be in constant communication. For example, the controller 702 may communicate with the information device 150 on an as-needed or periodic basis. Similarly, the controller 702 may communicate with a consuming device 800 only when the consuming device 800 is located near the controller 702 or the consumable item dispenser 704.

According one embodiment of the present invention, the controller 702 receives a request for a consumable item parameter from the consuming device 800 (e.g., from an automobile). The controller 702 then arranges for an appropriate consumable item parameter to be transmitted to the consuming device 800. Note that, according to one embodiment, the consuming device 800 does not need to send a request for the consumable item parameter to the controller 702.

According to another embodiment, the consuming device 800 receives a request for a consumable item parameter from the controller 702. The consuming device 800 then arranges for the consumable item parameter to be transmitted to the controller 702. Note that, according to one embodiment, the controller 702 does not need to send a request for the consumable item parameter to the consuming device 800.

The controller 702 and/or the consuming device 800 may further arrange for an exchange of payment associated with a customer or consumer, a provider (e.g., a provider of the consumable item), and/or a third party. For example, the controller 702 may communicate with the payment device 160 to arrange for the customer to provide payment (e.g., via his or her credit card account, debit card account, banking account, or a digital payment protocol) based on an exchange of a consumable item parameter and/or a consumable item. According to another embodiment, the controller 702 instead arranges to provide payment to a customer based on the exchange of the consumable item parameter. The controller 702 may also adjust a price associated with either the consumable item parameter or a consumable item.

Note that payments may be exchanged with a third party (e.g., an automobile manufacturer associated with the information device 150) and that the consuming device 800 may communicate directly with the payment device 160. According to one embodiment, the controller 702 further verifies that the consuming device 800 is authorized to receive and/or transmit a consumable item parameter. For example, only customers who subscribe to a supplemental service may be allowed to receive and/or transmit a consumable item parameters.

Moreover, the controller 702 may exchange consumable item parameters with a plurality of consuming devices 800 (associated with a single customer or a plurality of customers) at substantially the same time.

EXAMPLE

Figure 6:
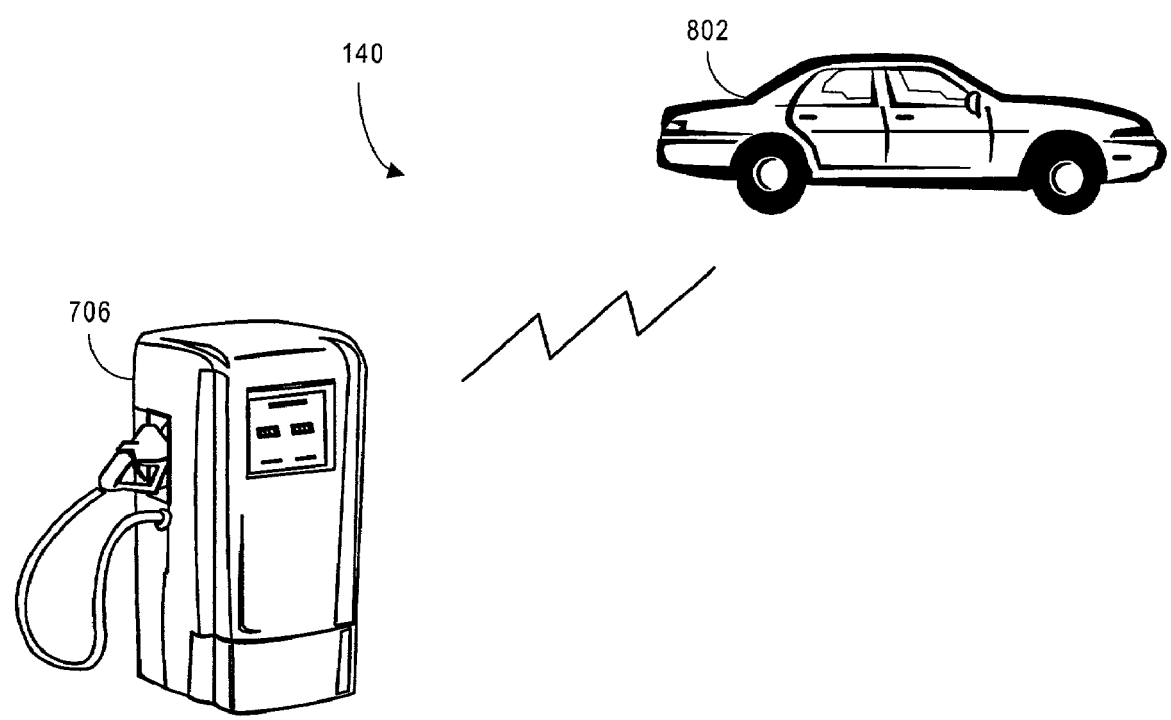
FIG. 6 is a block diagram overview of a fuel dispensing system according to an embodiment of the present invention.

FIG. 6 is a block diagram overview of a fuel dispensing system 140 according to an embodiment of the present invention. As shown in FIG. 6, a fuel pump 706 (which may include, or communicate with, the controller 702 described with respect to FIG. 5 and/or a fuel nozzle) may communicate with an automobile 802.

When a customer drives his or her automobile 802 near the fuel pump 706, the fuel pump transmits a request for consumable item parameters to the automobile 802. The automobile 802 then transmits (i) the automobile's manufacturer, model number, and year and (ii) a list of acceptable gasoline octane ratings to the fuel pump 706. Based on this information, the fuel pump 706 determines that Methyl Tertiary Butyl Ethane (MTBE) should be added to dispensed fuel to let the automobile 802 use the dispensed fuel more efficiently. The fuel pump 706 also selects an appropriate gasoline octane rating based on the list of acceptable ratings.

Examples of devices that may be used in connection with the systems 110, 120, 130, 140 discussed herein will now be described in detail with respect to FIGS. 7 and 8.

Dispensing Device

Figure 7:
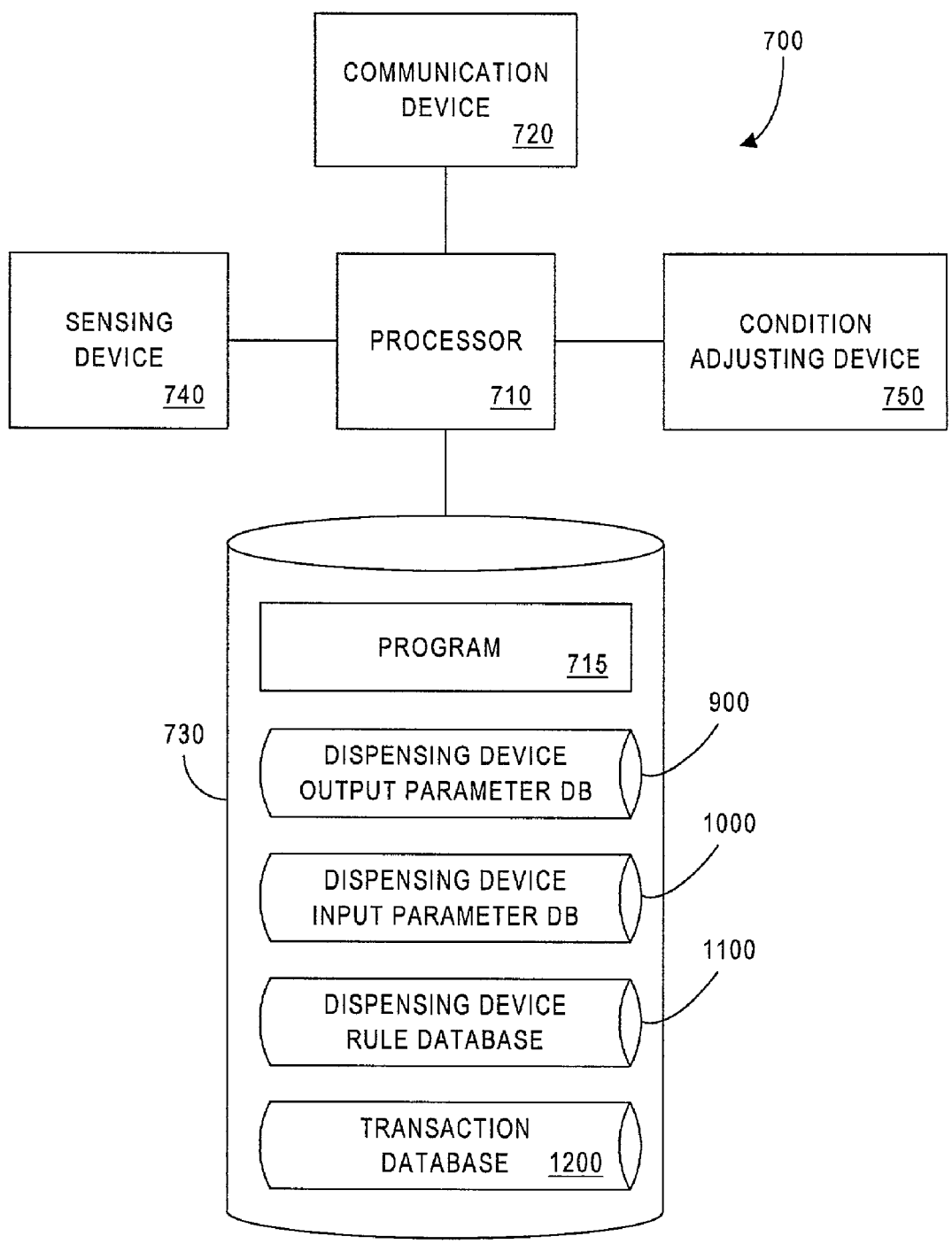
FIG. 7 is a block diagram of a dispensing device according to an embodiment of the present invention.

FIG. 7 illustrates a dispensing device 700 that is descriptive of the device shown, for example, in FIGS. 1 and 3 according to an embodiment of the present invention. The dispensing device 700 comprises a processor 710, such as one or more INTEL® Pentium® processors, coupled to a communication device 720 configured to communicate via a communication network (not shown in FIG. 7). The communication device 720 may be used to communicate, for example, with one or more consuming devices 800, information devices 150, and/or payment devices 160.

The processor 710 is also in communication with a sensing device 740. The sensing device 740 may comprise, for example, a thermometer. Such an sensing device 740 may be used, for example, to determine one or more consumable item parameters to be transmitted to a consuming device 800.

The processor 710 is also in communication with a condition adjusting device 750. The output device 750 may comprise, for example, a temperature adjusting device. The condition adjusting device 750 may be used, for example, to adjust one or more conditions associated with a consumable item based on one or more consumable item parameters received from a consuming device 800.

The processor 710 is also in communication with a storage device 730. The storage device 730 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance with the present invention. For example, the processor 710 may transmit a consumable item parameter request to a device associated with the consumable item (including the consumable item itself or a device that controls or consumes the consumable item) and receive the consumable item parameter. According to another embodiment, the processor 710 receives a consumable item parameter request from a device associated with the consumable item and transmits the consumable item parameter.

As used herein, information may be "received" by or "transmitted" to, for example: (i) the dispensing device 700 from the consuming device 800; or (ii) a software application or module within the dispensing device 700 from another software application, module, or any other source.

As shown in FIG. 7, the storage device 730 also stores: a dispensing device output parameter database 900 (described with respect to FIG. 9); a dispensing device input parameter database 1000 (described with respect to FIG. 10); a dispensing device rule database 1100 (described with respect to FIG. 11); and a transaction database 1200 (described with respect to FIG. 12).

Consuming Device

Figure 8:
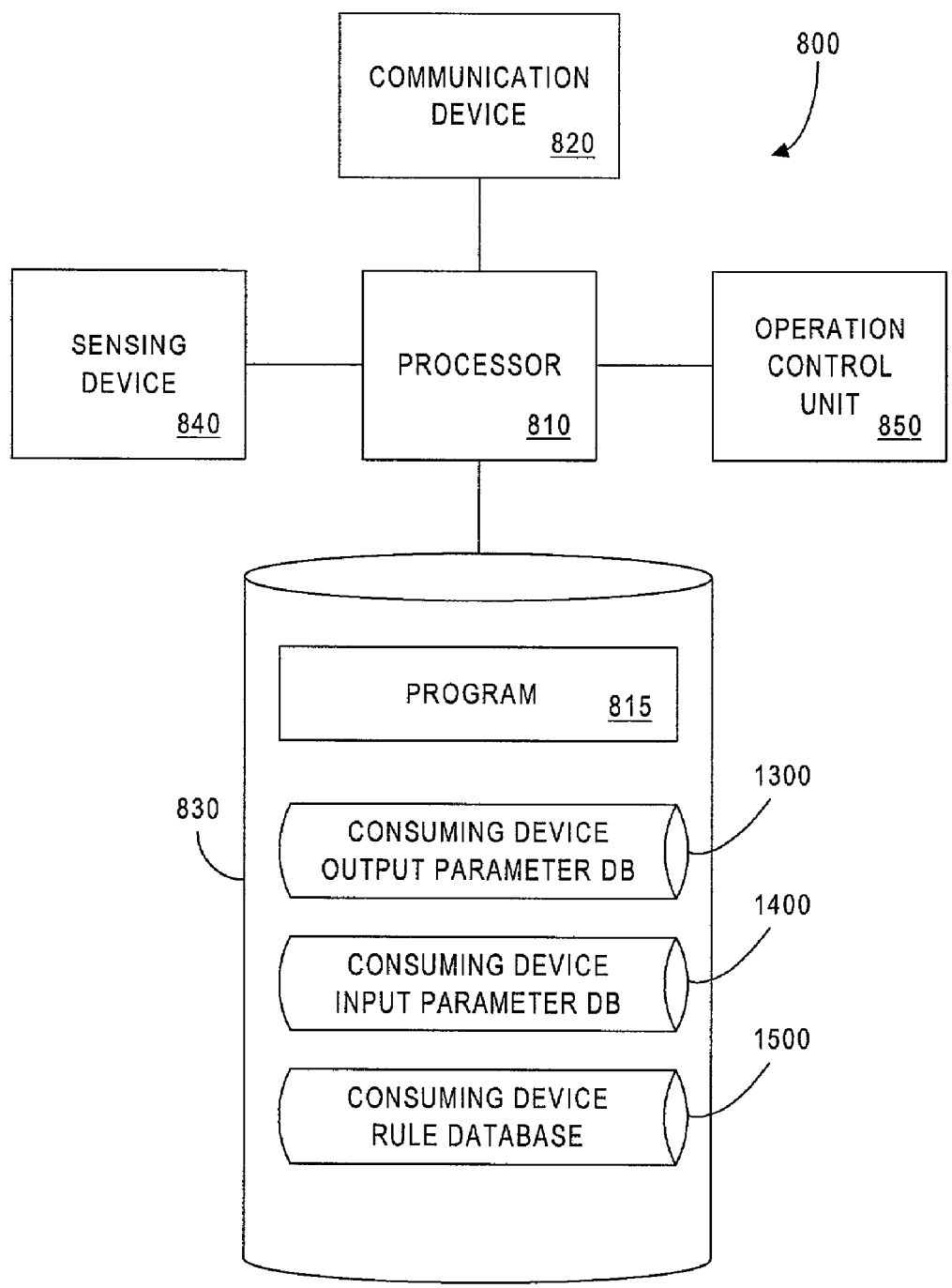
FIG. 8 is a block diagram of a consuming device according to an embodiment of the present invention.

FIG. 8 illustrates a consuming device 800 that is descriptive of the device shown, for example, in FIGS. 1 and 3 according to an embodiment of the present invention. The consuming device 800 comprises a processor 810, such as one or more INTEL® Pentium® processors, coupled to a communication device 820 configured to communicate via a communication network (not shown in FIG. 8). The communication device 820 may be used to communicate, for example, with one or more dispensing devices 700, and/or payment devices 160.

The processor 810 is also in communication with a sensing device 840. The sensing device 840 may comprise, for example, a thermometer. Such an sensing device 840 may be used, for example, to determine one or more consumable item parameters to be transmitted to a dispensing device 700.

The processor 810 is also in communication with an operation control unit 850. The operation control unit 850 may comprise, for example, a processor that controls a fuel injection device in an automobile. The operation control unit 850 may be used, for example, to control the consumption of a consumable item based on one or more consumable item parameters received from a dispensing device 700.

The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as RAM devices and ROM devices.

The storage device 830 stores a program 815 for controlling the processor 810. The processor 810 performs instructions of the program 815, and thereby operates in accordance with the present invention. For example, the processor 810 may transmit a consumable item parameter request to a device associated with the consumable item (e.g., the dispensing device 700) and receive the consumable item parameter. The processor 810 may also receive a consumable item parameter request from a device associated with the consumable item and transmit the consumable item parameter.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the consuming device 800 from the dispensing device 700; or (ii) a software application or module within the consuming device 800 from another software application, module, or any other source.

As shown in FIG. 8, the storage device 830 also stores: a consuming device output parameter database 1300 (described with respect to FIG. 13); a consuming device input parameter database 1400 (described with respect to FIG. 14); and a consuming device rule database 1500 (described with respect to FIG. 15). Examples of databases that may be used in connection with the systems 110, 120, 130, 140 will now be described in detail with respect to FIGS. 9 through 15. The illustrations and accompanying descriptions of the databases presented herein are exemplary, and any number of other database arrangements could be employed besides those suggested by the figures.

Dispensing Device Output Parameter Database

Referring to FIG. 9, a table represents the dispensing device output parameter database 900 that may be stored at the dispensing device 700 according to an embodiment of the present invention. The table includes entries identifying consumable item parameters that may be transmitted from the dispensing device 700 to a consuming device 800. The table also defines fields 902, 904, 906 for each of the entries. The fields specify: a parameter identifier 902, a description 904, and one or more values 906. The information in the dispensing device output parameter database 900 may be created and updated, for example, based on information received from one or more information devices 150 and/or sensing devices 740.

The parameter identifier 902 may be, for example, an alphanumeric code associated with consumable item parameter that can be transmitted from the dispensing device 700 to the consuming device 800. The description 904 contains information describing the consumable item parameter, and the value or values 906 represent the value or values that may be associated with the consumable item parameter.

Dispensing Device Input Parameter Database

Figure 10:
FIG. 10 is a tabular representation of a portion of a dispensing device input parameter database according to an embodiment of the present invention.

Referring to FIG. 10, a table represents the dispensing device input parameter database 1000 that may be stored at the dispensing device 700 according to an embodiment of the present invention. The table includes entries identifying consumable item parameters that may be received by the dispensing device 700 from a consuming device 800. The table also defines fields 1002, 1004, 1006 for each of the entries. The fields specify: a parameter identifier 1002, a description 1004, and a current value 1006. The information in the dispensing device input parameter database 1000 may be updated, for example, based on information received from a consuming device 800. Note that, according to one embodiment, a separate dispensing device input parameter database 1000 is maintained for each consuming device 800.

The parameter identifier 1002 may be, for example, an alphanumeric code associated with consumable item parameter that has been received by the dispensing device 700 from a consuming device 800. The description 1004 contains information describing the consumable item parameter, and the current value 1006 represent the value currently associated with the consumable item parameter.

Dispensing Device Rule Database

Referring to FIG. 11, a table represents the dispensing device rule database 1100 that may be stored at the dispensing device 700 according to an embodiment of the present invention. The table includes entries identifying rules that may be used by the dispensing device 700 in association with one or more consumable item parameters. The table also defines fields 1102, 1104, 1106 for each of the entries. The fields specify: a rule identifier 1102, a condition 1104, and an action 1106.

The rule identifier 1102 may be, for example, an alphanumeric code associated with a consumable item parameter rule. The condition 1104 indicates one or more conditions that may be evaluated by the dispensing device 700. The action 1106 indicates one or more acts or steps that may be performed by the dispensing device 700 when an associated condition 1104 is satisfied.

For example, as illustrated by the second entry shown in FIG. 11 (i.e., having a rule identifier 1102 of "DR-1002"), the dispensing device 700 may compare a parameter stored in the dispensing device input parameter database 1000 (i.e., "DI-1004" associated with the consuming device's preferred octane rating) with a threshold value. The dispensing device 700 may then perform an action 1106 based on the comparison.

Transaction Database

Referring to FIG. 12, a table represents a record in the transaction database 1200 that may be stored at the dispensing device 700 according to an embodiment of the present invention. The database includes records associated with consumable item transactions. The information in the transaction database 1200 may be created and updated, for example, when a consumable item is purchased via the dispensing device 700.

As shown in FIG. 12, each record indicates a transaction identifier 1202 and a consuming device identifier 1204 associated with the transaction and a consuming device, respectively. Each record also includes a payment identifier 1206 associated with the transaction. The payment identifier 1206 may comprise, for example, a credit card, debit card or bank account number (e.g., a checking account number) or digital payment protocol information. The payment identifier 1206 may be used, for example, by the dispensing device 700 to arrange for a customer to provide or receive payment. A date and time 1208 indicates a date and time associated with the transaction, and a transaction total 1210 indicates a total amount paid by the customer (e.g., in exchange for a consumable item). A transaction status 1212 indicates whether the transaction is "in process" or "complete."

The table also defines fields 1214, 1216, 1218 for each record. The fields specify: a parameter identifier 1214, a value 1216, and a cost 1218. The parameter identifier 1214 may be based on, or associated with, the parameter identifier 902 stored in the dispensing device output parameter database 900 and/or the parameter identifier 1002 stored in the dispensing device input parameter database 1000.

The value 1216 indicates the value associated with the parameter identifier 1214 at the time of the transaction. The value 1216 may indicate, for example, an octane rating or a software version number associated with the transaction. The cost 1218 indicates an amount paid by a customer in association with the parameter identifier 1214. Note that the transaction total 1210 may be calculated by adding each of the costs 1218 associated with the transaction.

Consuming Device Output Parameter Database

Referring to FIG. 13, a table represents the consuming device output parameter database 1300 that may be stored at the consuming device 800 according to an embodiment of the present invention. The table includes entries identifying consumable item parameters that may be transmitted from the consuming device 800 to a dispensing device 700. The table also defines fields 1302, 1304, 1306 for each of the entries. The fields specify: a parameter identifier 1302, a description 1304, and a current value 1306. The information in the consuming device output parameter database 1300 may be created and updated, for example, based on information received from one or more sensing devices 840.

The parameter identifier 1302 may be, for example, an alphanumeric code associated with consumable item parameter that can be transmitted from the consuming device 800 to a dispensing device 700. Note that each entry in the consuming device output parameter database 1300 may correspond to an entry in the dispensing device input parameter database 1000.

The description 1304 contains information describing the consumable item parameter, and the current value 1306 represent the value that is currently associated with the consumable item parameter.

Consuming Device Input Parameter Database

Referring to FIG. 14, a table represents the consuming device input parameter database 1400 that may be stored at the consuming device 800 according to an embodiment of the present invention. The table includes entries identifying consumable item parameters that may be received by the consuming device 800 from a dispensing device 700. The table also defines fields 1402, 1404, 1406 for each of the entries. The fields specify: a parameter identifier 1402, a description 1404, and value or values 1406. The information in the consuming device input parameter database 1400 may be updated, for example, based on information received from a dispensing device 700.

The parameter identifier 1402 may be, for example, an alphanumeric code associated with consumable item parameter that has been received by the consuming device 800 from a dispensing device 700. Note that each entry in the consuming device input parameter database 1400 may correspond to an entry in the dispensing device output parameter database 900.

The description 1404 contains information describing the consumable item parameter, and the value or values 1406 represent the value or values associated with the consumable item parameter.

Consuming Device Rule Database

Referring to FIG. 15, a table represents the consuming device rule database 1500 that may be stored at the consuming device 800 according to an embodiment of the present invention. The table includes entries identifying rules that may be used by the consuming device 800 in association with one or more consumable item parameters. The table also defines fields 1502, 1504, 1506 for each of the entries. The fields specify: a rule identifier 1502, a condition 1504, and an action 1506.

The rule identifier 1502 may be, for example, an alphanumeric code associated with a consumable item parameter rule. The condition 1504 indicates one or more conditions that may be evaluated by the consuming device 800. The action 1506 indicates one or more acts or steps that may be performed by the consuming device 800 when an associated condition 1504 is satisfied.

For example, as illustrated by the fourth entry shown in FIG. 15 (i.e., having a rule identifier 1502 of "CR-1004"), the consuming device 800 may compare a parameter stored in the consuming device input parameter database 1400 (i.e., "CI-1004" associated with a location's altitude) with a threshold value. The consuming device 800 may then instruct an operation control unit 850 to consume a consumable item in accordance with the consumable item parameter.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although some of the embodiments described herein are associated with fuel being dispensed to an automobile, according to another embodiment the consumable item parameter is exchanged in association with fuel being dispensed to an airplane or a boat. Similarly, according to other embodiments, fuel is instead dispensed from a fuel delivery service to a gasoline station or from an oil delivery service to a customer's home oil tank.

According to another embodiment, the consumable item parameter can prevent a consumable item from being dispensed. For example, a customer's automobile may transmit governmental inspection and emissions information to a fuel pump. The fuel pump may then use that information to determine if fuel will be dispensed to the automobile.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating fuel consumption, comprising:
transmitting an ambient condition parameter request from a consuming device to a fuel dispenser;
receiving the ambient condition parameter from the fuel dispenser;
receiving fuel from the fuel dispenser; and
adjusting at least one consumption parameter based on the ambient condition parameter such that a way in which the fuel is consumed by the consuming device is adjusted.

2. The method of claim 1, wherein the ambient condition parameter request includes at least one of: (i) a requesting device identifier, (ii) a customer identifier, (iii) a fuel provider identifier, (iv) a third party identifier, (v) an ambient condition parameter identifier, (vi) a payment identifier, or (vii) a fuel identifier.

3. The method of claim 1, wherein the ambient condition parameter comprises information usable to improve consumption of the fuel.

4. The method of claim 1, wherein the ambient condition parameter comprises information usable to at least: (i) select the fuel, (ii) select a condition associated with the fuel, (iii) select a quantity associated with the fuel, or (iv) select a price associated with the fuel.

5. The method of claim 1, wherein the consuming device comprises at least one of: (i) a device powered by the fuel, (ii) a vehicle, or (iii) a device adapted to transform the fuel.

6. The method of claim 1, further comprising: verifying that the fuel dispenser is authorized to provide the ambient condition parameter.

7. The method of claim 1, further comprising: based on said receiving, arranging for an exchange of payment with at least one of: (i) a customer, (ii) a provider, or (iii) a third party.

8. The method of claim 7, wherein said arranging is performed via a payment identifier, the payment identifier being further associated with a payment in exchange for the fuel.

9. The method of claim 1, wherein said receiving the ambient condition parameter is performed via at least one of: (i) a wireless device, (ii) a Bluetooth device, (iii) a communication port, (iv) a storage device, (v) an optical device, (vi) a magnetic device, or (vii) a device adapted to detect a material.

10. A computer-implemented method of facilitating fuel consumption, comprising:
transmitting via a wireless device an ambient condition parameter request to a device associated with dispensing fuel;
receiving the ambient condition parameter, the ambient condition parameter comprising information usable to improve a consumption of the fuel;
receiving the fuel; and
improving consumption of the fuel based on the ambient condition parameter.

11. An apparatus, comprising:
a processor; and
a storage device in communication with said processor and storing instructions adapted to be executed by said processor to:
transmit an ambient condition parameter request from a consuming device to a fuel dispenser;
receive the ambient condition parameter from the fuel dispenser;
receive fuel from the fuel dispenser; and
adjust at least one consumption parameter based on the ambient condition parameter such that a way in which the fuel is consumed by the consuming device is adjusted.

12. The apparatus of claim 11, wherein the ambient condition parameter request includes at least one of: (i) a requesting device identifier, (ii) a customer identifier, (iii) a fuel provider identifier, (iv) a third party identifier, (v) an ambient condition parameter identifier, (vi) a payment identifier, or (vii) a fuel identifier.

13. The apparatus of claim 11, wherein the ambient condition parameter comprises information usable to improve consumption of the fuel.

14. The apparatus of claim 11, wherein the ambient condition parameter comprises information usable to at least: (i) select the fuel, (ii) select a condition associated with the fuel, (iii) select a quantity associated with the fuel, or (iv) select a price associated with the fuel.

15. The apparatus of claim 11, wherein the consuming device comprises at least one of: (i) a device powered by the fuel, (ii) a vehicle, or (iii) a device adapted to transform the fuel.

16. The apparatus of claim 11, wherein execution of the instructions further cause the processor to:
verify that the fuel dispenser is authorized to provide the ambient condition parameter.

17. The apparatus of claim 11, wherein execution of the instructions further cause the processor to:

based on said receiving, arrange for an exchange of payment with at least one of: (i) a customer, (ii) a provider, or (iii) a third party.

18. The apparatus of claim 17, wherein the exchange is performed via a payment identifier, the payment identifier being further associated with a payment in exchange for the fuel.

19. The apparatus of claim 11, wherein the ambient condition parameter is received via at least one of: (i) a wireless device, (ii) a Bluetooth device, (iii) a communication port, (iv) a storage device, (v) an optical device, (vi) a magnetic device, or (vii) a device adapted to detect a material.

20. A medium storing instructions adapted to be executed by a processor to perform a method of facilitating fuel consumption, said method comprising:

transmitting an ambient condition parameter request from a consuming device to a fuel dispenser;

receiving the ambient condition parameter from the fuel dispenser;

receiving fuel from the fuel dispenser; and adjusting at least one consumption parameter based on the ambient condition parameter such that a way in which the fuel is consumed by the consuming device is adjusted.

* * * * *